(12) United States Patent
Krishnamoorthy

(10) Patent No.: US 10,803,182 B2
(45) Date of Patent: Oct. 13, 2020

(54) THREAT INTELLIGENCE FOREST FOR DISTRIBUTED SOFTWARE LIBRARIES

(71) Applicant: Bank of America Corporation, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

(21) Appl. No.: 16/207,636

(22) Filed: Dec. 3, 2018

(65) Prior Publication Data
US 2020/0175173 A1   Jun. 4, 2020

(51) Int. Cl.
| | | |
|---|---|---|
| *G06F 21/55* | (2013.01) | |
| *G06F 21/57* | (2013.01) | |
| *G06F 16/901* | (2019.01) | |
| *G06N 3/04* | (2006.01) | |
| *G06N 3/08* | (2006.01) | |
| *G06F 21/56* | (2013.01) | |
| *G06F 21/50* | (2013.01) | |

(52) U.S. Cl.
CPC ........ *G06F 21/577* (2013.01); *G06F 16/9024* (2019.01); *G06N 3/0445* (2013.01); *G06N 3/08* (2013.01); *G06F 2221/033* (2013.01)

(58) Field of Classification Search
None
See application file for complete search history.

(56) References Cited

U.S. PATENT DOCUMENTS

| | | |
|---|---|---|
| 7,016,884 B2 | 3/2006 | Platt et al. |
| 7,644,052 B1 | 1/2010 | Chang et al. |
| 9,092,802 B1 | 7/2015 | Akella |
| 9,516,053 B1 | 12/2016 | Muddu et al. |
| 2003/0023571 A1 | 1/2003 | Barnhill |
| 2008/0082968 A1 | 4/2008 | Chang et al. |
| 2012/0158633 A1 | 6/2012 | Eder |
| 2013/0246322 A1 | 9/2013 | De Sousa Webber |
| 2014/0121985 A1 | 5/2014 | Sayood et al. |
| 2015/0254555 A1 | 9/2015 | Williams, Jr. et al. |

(Continued)

OTHER PUBLICATIONS

Fear the EAR: Discovering and Mitigating Execution After Redirect Vulnerabilities. Doupe et al. ACM. (Year: 2011).*

(Continued)

*Primary Examiner* — Venkat Perungavoor
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for a security vulnerability analysis and management platform utilizing deep learning technology and knowledge graph database structures. The system is configured to receive software code and metadata corresponding to existing issues and defects present in the software code or associated with the implementation of the software code. By applying a deep learning technique to extract data from the open source software code, wherein the data corresponds to potential issues and defects in the open source software code, the system is configured to populate a knowledge graph database and build a unified cybersecurity ontology that can later be organized and queried based on user input.

17 Claims, 4 Drawing Sheets

(56) References Cited

U.S. PATENT DOCUMENTS

| | | |
|---|---|---|
| 2015/0278350 A1 | 10/2015 | Nice et al. |
| 2015/0310862 A1 | 10/2015 | Dauphin et al. |
| 2015/0363294 A1* | 12/2015 | Carback, III ............. G06F 8/37 717/132 |
| 2016/0019471 A1 | 1/2016 | Shin et al. |
| 2016/0055409 A1 | 2/2016 | Majumdar et al. |
| 2016/0142266 A1 | 5/2016 | Carroll et al. |
| 2017/0024375 A1 | 1/2017 | Hakkani-Tur et al. |
| 2018/0052884 A1 | 2/2018 | Kale et al. |
| 2018/0053088 A1 | 2/2018 | Chakraborty et al. |
| 2018/0082183 A1 | 3/2018 | Hertz et al. |
| 2018/0115578 A1 | 4/2018 | Subbarayan et al. |
| 2019/0042932 A1 | 2/2019 | Bhat et al. |

OTHER PUBLICATIONS

Can Source Code Auditing Software Identify Common Vulnerabilities and Be Used to Evaluate Software Security? Heffley et al. IEEE. (Year: 2004).*
CN 109657473. Deqing et al. (Year: 2019).*
CN 108763931. Yi et al. (Year: 2018).*
CN 108549817. Wei et al. (Year: 2018).*

\* cited by examiner

THREAT INTELLIGENCE FOREST FOR DISTRIBUTED SOFTWARE LIBRARIES

FIELD OF THE INVENTION

The present invention generally relates to the field of security issue identification and resolution within a distributed library of software applications. In particular, the novel present invention provides a unique platform for identification of potential security vulnerabilities, existing defects within a network, and potential issues that may arise when deployment new applications on a platform. Embodiments of the inventions are configured to leverage a unified cybersecurity ontology to build a graph database which would be used as a query and alert management system for developers, end users.

BACKGROUND

Implementation of software solutions that utilize distributed software libraries is becoming increasingly prevalent. Code language from various sources may be utilized to achieve a particular solution for a business or entity. These various sources may include code written by a business or entity itself, or may be sourced from third parties or engineered in such a way that incorporates or builds upon existing open source code. Typically, vulnerabilities within distributed software libraries may be analyzed based on an application by application basis, wherein bugs or defects are identified with respect to individual applications. In addition, previously known bugs and defects with regard to certain applications or code libraries may be tracked and managed in order to anticipate potential issues that may arise during implementation. However, in conventional systems, the process of identifying, tracking, and addressing potential bugs or defects may fail to encapsulate broad implementation problems that may arise when multiple libraries interface with one another. As such, a need exists for a solution to analyze distributed software libraries to determine potential bugs or defects that may be compounded by the implementation of a platform that involves code from multiple sources.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for user interface construction based on analysis, processing and assessment of software code vulnerabilities. Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive open source software code and metadata corresponding to existing issues and defects present in the open source software code or associated with the implementation of the open source software code; apply a deep learning technique to extract data from the open source software code, wherein the data corresponds to potential issues and defects in the open source software code; populate a knowledge graph database with the metadata and extracted data from the open source software code; further populate the knowledge graph with metadata and extracted data from one or more currently installed software applications that interact with the open source software to create a unified cybersecurity ontology; define a threat context indicator comprising a metric for identifying a vulnerability based on the unified cybersecurity ontology; and present a user with a management interface wherein the user can query the security vulnerability analysis and management platform to determine identified vulnerabilities.

In some embodiments, the system is further configured to present a user with a management interface wherein the user can query the security vulnerability analysis and management platform to determine the identified specific vulnerabilities.

In some embodiments, the management interface displays the identified specific vulnerabilities as a knowledge graph ontology comprising graphical depictions of data relationships.

In some embodiments, the system is further configured to alert a user of the identified specific vulnerabilities.

In some embodiments, the unified cybersecurity ontology further comprises a library dependency tree, a bug and issues tree, and an installed software dependency tree.

In some embodiments, the deep learning technique further comprises using a long short-term memory module to predict future implications of deploying the software code in an existing software environment.

In some embodiments, the deep learning technique results in output data in resource description framework format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
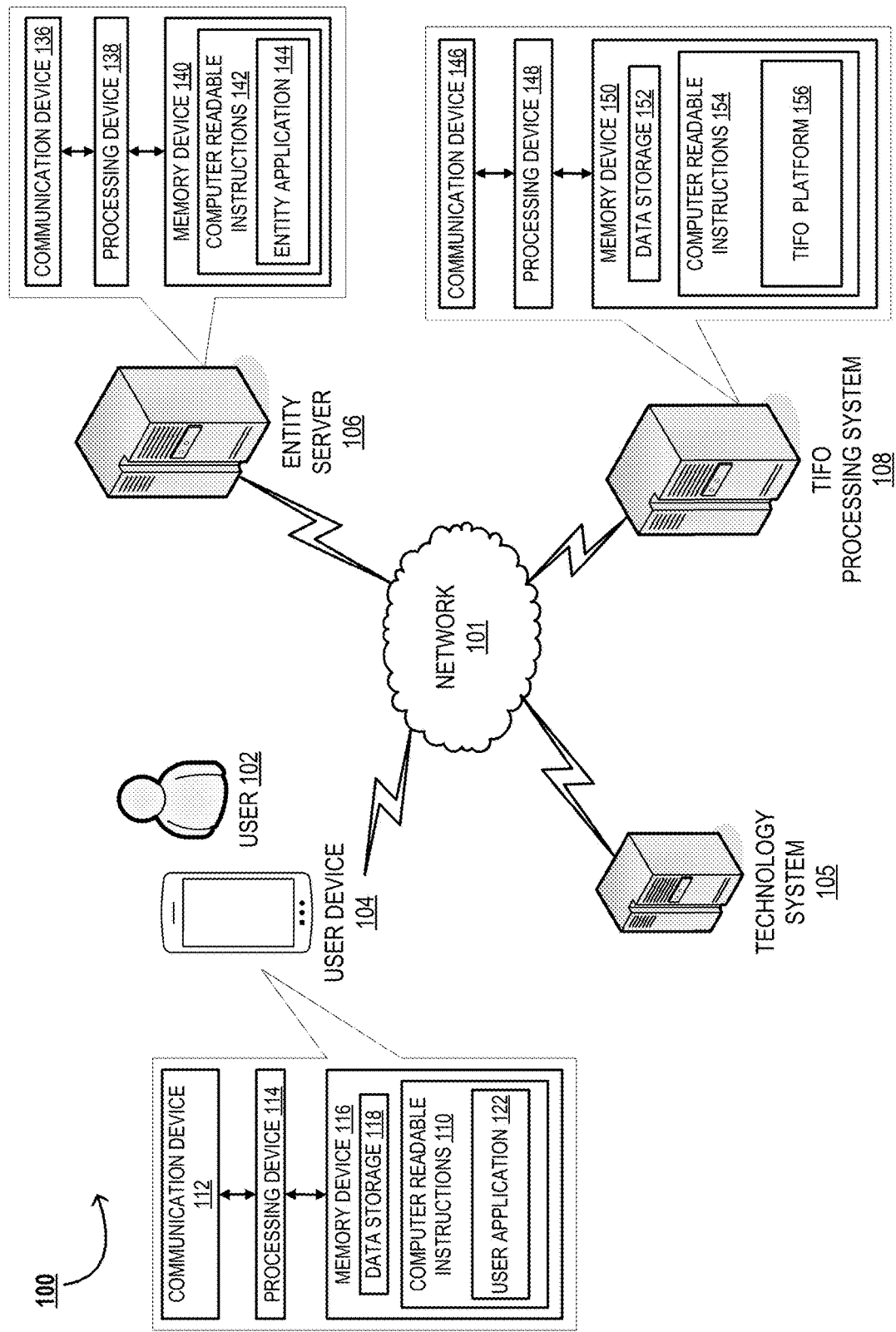
Figure 2:
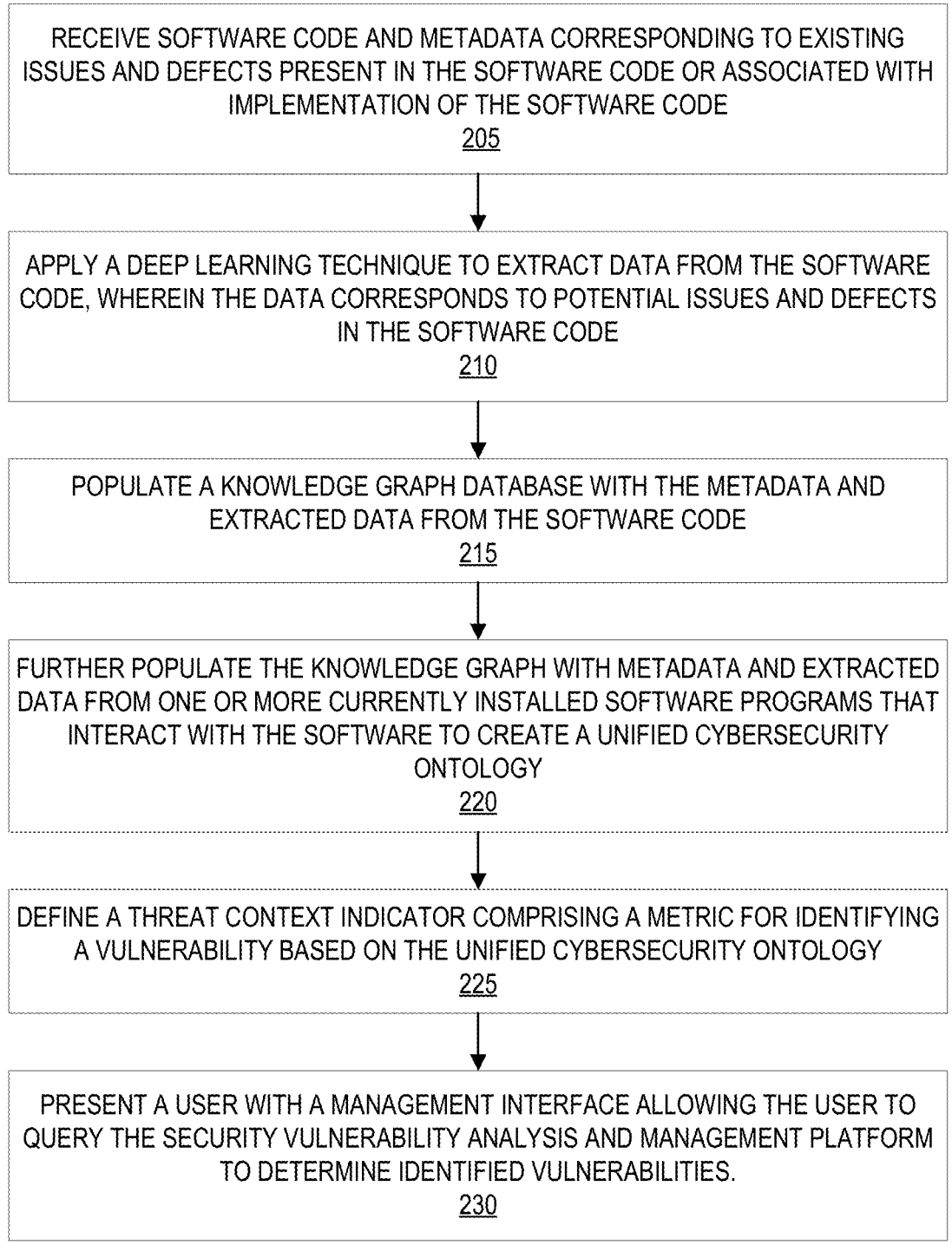
Figure 3:
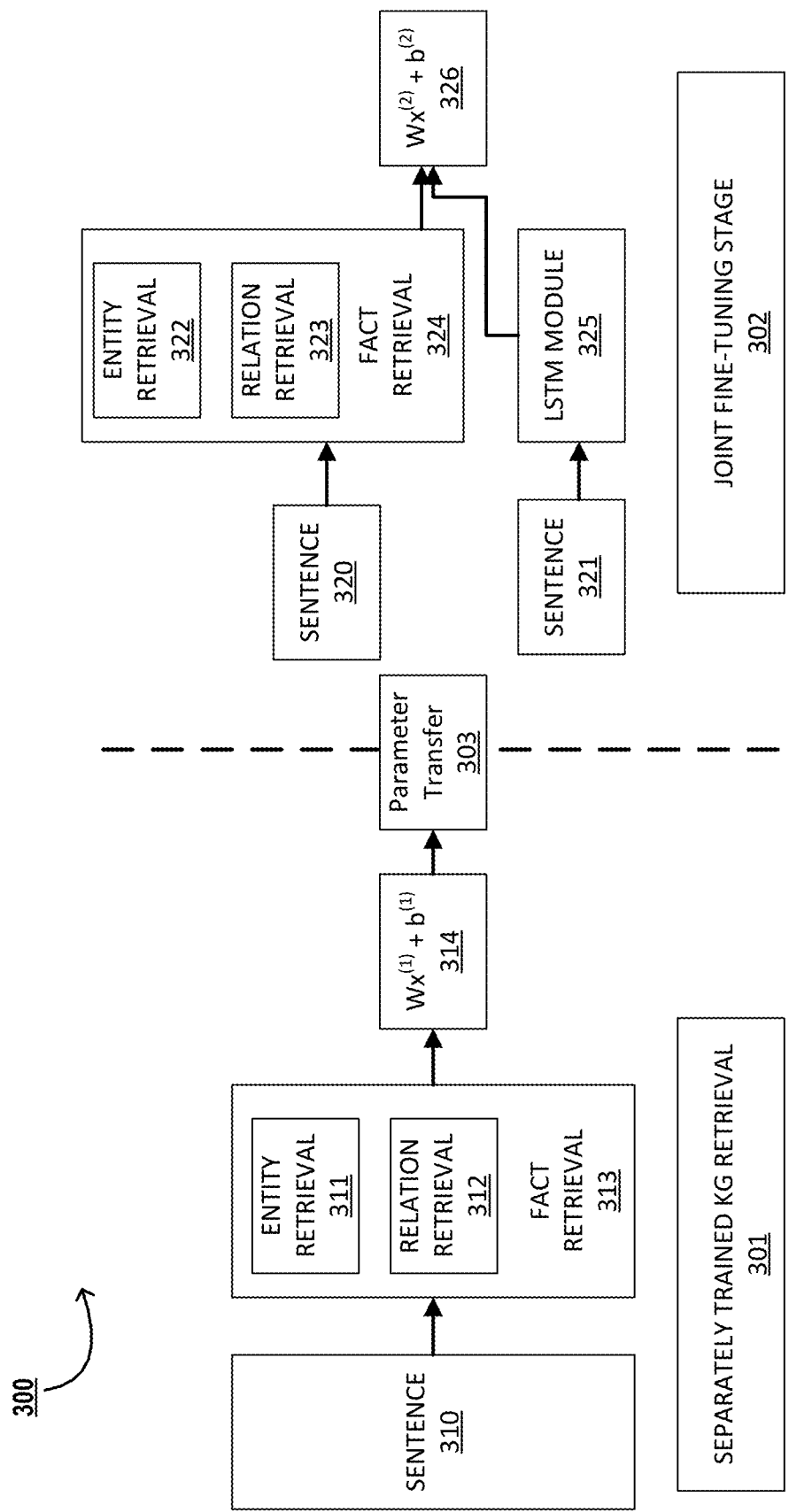
Figure 4:
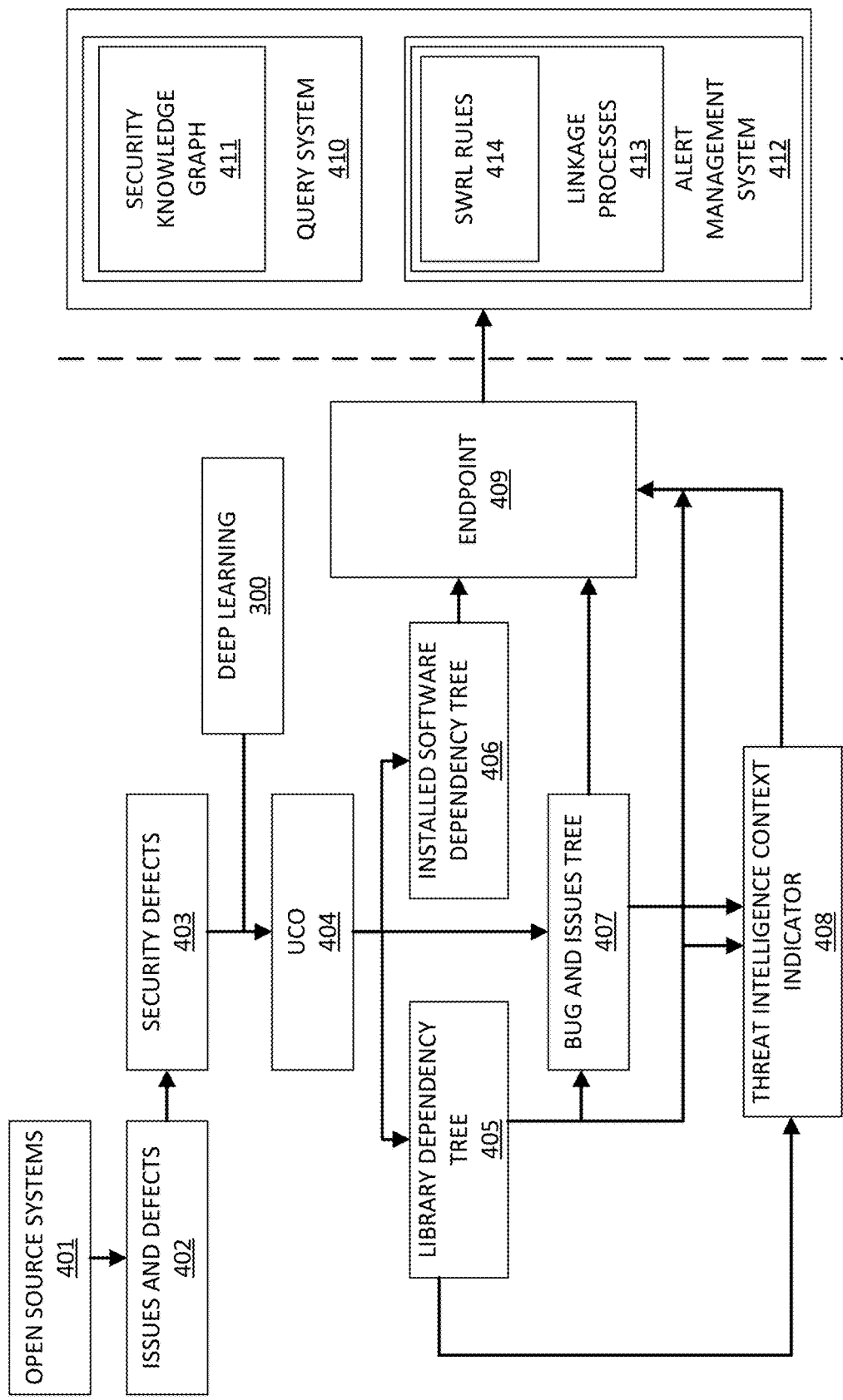

Having thus described embodiments of the invention in general terms, reference will now be made to the accompanying drawings, wherein:

FIG. 1 depicts a threat intelligence forest system environment 100, in accordance with one embodiment of the present invention;

FIG. 2 depicts a high level process flow 200 for TIFO code analysis and unified ontology cybersecurity ontology platform, in accordance with one embodiment of the present invention;

FIG. 3 depicts a reinforcement learning process flow 300 for program analysis, in accordance with one embodiment of the present invention; and FIG. 4 depicts a threat intelligence forest creation process flow 400, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

FIG. 1 illustrates a threat intelligence forest system environment 100, in accordance with some embodiments of the present invention. As illustrated in FIG. 1, a Threat Intelligence Forest for Open Source ("TIFO") processing system 108 is operatively coupled, via a network 101 to a user device 104, to an entity server 106, and to a technology system 105. In this way, the TIFO processing system 108 can send information to and receive information from the user device 104, the entity server 106, and the technology system 105. FIG. 1 illustrates only one example of an embodiment of the threat intelligence forest system environment 100, and it will be appreciated that in other embodiments one or more of the systems, devices, or servers may be combined into a single system, device, or server, or be made up of multiple systems, devices, or servers. In this way, the TIFO processing system 108, is configured for receiving software code for analysis, performing code analysis using a deep learning algorithm, identifying software vulnerabilities, and populating a knowledge graph database to further assess system vulnerabilities between multiple software libraries.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide software code for analysis, query the TIFO processing system for identified vulnerabilities, set parameters and metrics for data analysis, and/or receive/utilize alerts created and disseminated by the TIFO processing system 108. As such, in some embodiments, the user 102 may be associated with the entity and/or a financial institution. In other embodiments, the user 102 may be associated with another system or entity, such as technology system 105, which may be a third party system which is granted access to the TIFO processing system 108 or entity server 106 in some embodiments.

FIG. 1 also illustrates a user device 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity server 106, the TIFO processing system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the TIFO processing system 108 and/or the entity server 106 are configured to cause the processing device 114 to execute the computer readable instructions 110, thereby causing the user device 104 to perform one or more functions described herein, for example, via the user application 122 and the associated user interface.

As further illustrated in FIG. 1, the TIFO processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the TIFO processing system 108.

The processing device 148 is operatively coupled to the communication device 146 and the memory device 150. The processing device 148 uses the communication device 146 to communicate with the network 101 and other devices on the network 101, such as, but not limited to the entity server 106, the technology system 105, and the user device 104. As such, the communication device 146 generally comprises a modem, server, or other device for communicating with other devices on the network 101.

As further illustrated in FIG. 1, the TIFO processing system 108 comprises the computer-readable instructions 154 stored in the memory device 150, which in one embodiment includes the computer-readable instructions for the implementation of a TIFO platform 156. In some embodiments, the computer readable instructions 154 comprise executable instructions associated with the TIFO platform 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the TIFO platform 156 and its components/modules. The TIFO platform 156 is further configured to perform or cause other systems and devices to perform the various steps in processing software code, and organizing data as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the TIFO platform 156, entity server 106, user device 104, and technology system 105 and/or other systems and applications, to perform one or more steps described throughout this disclosure. Although various data processing steps may be described as being performed by the TIFO platform 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the TIFO processing system 108 may include multiple systems, servers, computers or the like maintained by one or many entities. FIG. 1 merely illustrates one of those TIFO processing systems 108 that, typically, interacts with many other similar systems to form the information network. In one embodiment of the invention, the TIFO processing system 108 is operated by the entity associated with the entity server 106, while in another embodiment it is operated by a second entity that is a different or separate entity from the entity server 106. In some embodiments, the entity server 106 may be part of the TIFO processing system 108. Similarly, in some embodiments, the TIFO processing system 108 is part of the entity server 106. In other embodiments, the entity server 106 is distinct from the TIFO processing system 108.

In one embodiment of the TIFO processing system 108, the memory device 150 stores, but is not limited to, the TIFO platform 156 as will be described later on with respect to FIG. 2. In one embodiment of the invention, the TIFO platform 156 may associated with computer-executable program code that instructs the processing device 148 to operate the communication device 146 to perform certain communication functions involving the technology system 105, the user device 104 and/or the entity server 106, as described herein. In one embodiment, the computer-executable program code of an application associated with the TIFO platform 156 may also instruct the processing device 148 to perform certain logic, data processing, and data storing functions of the application.

The processing device 148 is configured to use the communication device 146 to receive data, such as open source software code, metadata associated with software code or software libraries, transmit and/or cause display of constructed knowledge graphs, UIs and the like. In the embodiment illustrated in FIG. 1 and described throughout much of this specification, the TIFO platform 156 may perform one or more of the functions described herein, by the processing device 148 executing computer readable instructions 154 and/or executing computer readable instructions associated with one or more application(s)/devices/components of the TIFO platform 156.

As illustrated in FIG. 1, the entity server 106 is connected to the TIFO processing system 108 and may be associated with a financial institution network. In this way, while only one entity server 106 is illustrated in FIG. 1, it is understood that multiple network systems may make up the threat intelligence forest system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the TIFO processing system 108. The TIFO processing system 108 may communicate with the entity server 106 via a secure connection generated for secure encrypted communications between the two systems for communicating data for processing across various applications.

As further illustrated in FIG. 1, in some embodiments, the threat intelligence forest system environment 100 further comprises a technology system 105, in operative communication with the TIFO processing system 108, the entity server 106, and/or the user device 104. Typically, the technology system 105 comprises a communication device, a processing device and memory device with computer readable instructions. In some instances, the technology system 105 comprises a first database/repository comprising TIFO component objects, and/or a second database/repository comprising functional source code associated with TIFO component objects. These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a high level process flow 200 for TIFO code analysis and unified ontology cybersecurity ontology platform. Specifically, at block 205, the system is configured to receive open source software code and metadata corresponding to existing issues and defects present in the open source software code or associated with the implementation of the open source software code. The metadata corresponding to existing issues and defects in the open source code or associated with the implementation of the open source code may have been previously identified by the platform, or may have been detected and recorded by third parties not associated with the entity employing the platform. In addition, the metadata associated with the open source code may indicate a known problem that arises with implementing the open source code in conjunction with other software libraries that the entity may be currently implementing or plan to implement in the future.

Next, the system is configured to apply a deep learning technique to extract data from the open source software code, wherein the data corresponds to potential issues and defects in the open source software code, as indicated by block 210. In this way, the system may dissect the code language to quickly identify issues. As illustrated by block 215, the system is configured to populate a knowledge graph database with the metadata and extracted data from the open source software code. In this way, the system may form a series of trees or graph database structures indicating relationships between identified issues and graphically map the relationship between issues and bugs within the code.

Next, as illustrated by block 220, the system is configured to further populate the knowledge graph with metadata and extracted data from one or more currently installed software applications that interact with the open source software to create a unified cybersecurity ontology. As such, the knowledge graph database not only depicts the relationship between bugs and issues identified in the open source code, but the relationship between bugs and issues identified by the system and the issues and potential implementation consequences as they relate to other software libraries Next, the system defines a threat context indicator comprising a metric for identifying a vulnerability based on the unified cybersecurity ontology, as indicated by block 225. In this way, the system is configurable by the user who may say a threshold metric or definition for what constitutes a vulnerability Finally, as illustrated by block 230, the system presents the user with a management interface wherein the user can query the security vulnerability analysis and management platform to determine identified vulnerabilities.

FIG. 3 depicts a reinforcement learning process flow 300 for program analysis, in accordance with one embodiment of the present invention. The invention utilizes a reinforcement learning process such as DeepPath to analyze software natural code language and determine functionality and potential defects within the software, as well as viability of software within a library of other programs and software that may be employed by the entity. The reinforcement learning process analyzes the software and coverts the natural coding language into a resource description framework (RDF) format by utilizing a linear regression based on open source code attributes that can later be used to build a knowledge graph ontology. The reinforcement learning process can be customized by the user to dictate the specific information to be determined by the process based on the desired knowledge graph or ontology. In this way, the user may dictate the categories of information to be incorporated in the output knowledge graphs. In some embodiments, the software contains multiple programs that must be analyzed on both an individual basis as well as analyzed in terms of how they interact with one another and programs from other software libraries. Analysis of the data contained in the software programs and the relationships between the programs produces static data, and this portion of the process is represented by block 301 as separately trained knowledge graph (KG) retrieval.

The separately trained KG retrieval 301 portion begins at block 310, where a sentence from the software code is fed into the reinforcement learning process. In some embodiments, the software code to be analyzed contains data related to known defects or vulnerabilities embedded in or associated with the software code. The process analyzes and dissects the information from this data, as well as each line of the code itself, to determine various factual information, as represented by block 313 fact retrieval. This fact retrieval 313 is multidimensional in that it concerns two different facets of the software code; namely, what program elements or "entities" are contained within the software code and underlying programs within the software code, as well as how these entities reference or relate to one another. These two facets are represented in process 300 by entity retrieval 311 and relation retrieval 312. Once the process has determined what entities are present within the software and underlying programs, the data is simplified using a linear regression such as the one depicted in block 314. In this particular regression, $Wx^{(1)}+b^{(1)}$, "x" represents input vector data, "W" represents the number of programs where an entity is located, and b represents a cognitive bias that may be adjusted in the regression to achieve a desired variance of output data.

Next, as shown in block 303, parameters of the software code are transferred to the joint fine-tuning stage 302, where the software code is further analyzed to determine temporal data representing expected effects of deploying the software. In some embodiments, this analysis may contemplate deploying the software in an existing environment or software library containing a number of other software products and programs, each containing a number of embedded entities. The fact retrieval block 324, includes entity retrieval 322 and relation retrieval 323, much like the previous stage of separately trained KG retrieval 301. However, the joint fine-tuning stage 302 utilizes temporal data by inclusion of the long short-term memory (LSTM) module 325. The LSTM module 325 is recurrent neural network tool used for classifying, processing, and making predictions based on time series or temporal data.

Since complications and possible vulnerabilities posed by employing the software code may be linked to certain processes in a string of causal relationships, the process must analyze these potential effects using time dependent data. The LSTM module 325 allows the joint fine-tuning stage 302 to maintain a current state in the memory of the module, while predicting a future state of the data in a holistic manner. In this way, the joint fine-tuning stage 302 does not simply analyze the software code based on a program-by-program approach, but may also provide insight as to possible vulnerabilities or functional limitations that may arise as additional programs are involved downstream. In some embodiments, this stage may include analysis with respect to software libraries outside of the software code being analyzed, such as software libraries that are already in use by the entity or institution. Vectorized data produced by the fact retrieval block 324 and the LSTM module 325 is then fed into linear regression model 326, as represented by the equation $Wx^{(2)}+b^{(2)}$ in FIG. 3. Much like the linear regression in the separately trained KG retrieval stage 301, "x" represents input vector data, "W" represents the number of programs where an entity is located, and b represents a cognitive bias that may be adjusted in the regression to achieve a desired variance of output data.

FIG. 4 depicts a threat intelligence forest creation process 400, in accordance with one embodiment of the present invention. As shown, the process begins at block 401 where the open source systems are retrieved from a source. While this particular embodiment illustrates the process for creation of a threat intelligence forest for open source systems, it is understood that the same process may be applied to software from another source that may or may not be open source, such as a proprietary software system that an entity is interested in integrating into an existing software library or solution. Data related to known issues and defects may be retrieved from the source of the open source system 401, as signified by the issues and effects block 402. This information may be analyzed to further determine if any of the issues and defects 402 would present particular security concerns, as shown by the security defects block 403. This data and the software code itself is then analyzed using the deep learning process 300 as discussed previously in FIG. 3, resulting in RDF data that may then be used to build various knowledge graph ontologies.

As shown by block 404, the unified cybersecurity ontology (UCO) receives output data from the deep learning process 300, and consists of subsets of data extracted from the open source software or other sources. These subset ontologies are referred to as "trees" due to the hierarchical nature of their graphical representation of mapped relationships between entities within software programs. Shown in FIG. 4 are library dependency tree 405, installed software dependency tree 406, and bug and issues tree 407. The library dependency tree 405 is a subset of mapped data that corresponds to relationships between programs within various software. Installed software dependency tree 406 is a subset of mapped data that displays the relationships and identified vulnerabilities with regard to software that is currently deployed on the entity's platform. Lastly, bug and issues tree 407 is a subset of mapped data that corresponds to known bugs and issues related to the open source systems 401 and may also include known bugs and issues related to installed software.

Shown next in the process is threat intelligence context indicator 408, which analyzes relationships as library dependency tree 405, installed software dependency tree 406, and bug and issues tree 407 to discern potential security vulnerabilities or threats to the overall platform in the context of the identified relationships. Data from the library dependency tree 405, installed software dependency tree 406, bug and issues tree 407, and threat intelligence context indicator 408 are all able to be queried by a user from a single source, as represented by endpoint 409. In some embodiments, this query is achieved through a SPARQL protocol RDF query language, but it is understood that other embodiments may include support for additional languages.

On the right side of FIG. 4, query system 410 and alert management system 412 are shown. Query system 410 may be used to query data from the UCO 404, library dependency tree 405, installed software dependency tree 406, bug and issues tree 407, threat intelligence context indicator 408 based on a fully customizable set of rules corresponding to certain information that a user may be interested in. For instance, the user may be interested in identified vulnerabilities with regard to a specific set of installed software libraries and how these installed software libraries interact with particular open source systems. The query system presents this tailored information to the user as a security knowledge graph as depicted in block 411. In some embodiments, the system may alert users preemptively about detected vulnerabilities or problems that have been identified. This capability is depicted as alert management system 412, and is also fully customizable such that the user may set alert parameters based on software systems, programs, relationships, severity of possible data leakage, and the like. The alert management system 412 encompasses a set of linkage processes 413 that determine where alerts should be sent based on a semantic web rule language (SWRL) that determines rules in terms of classes, properties, individuals and the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for security vulnerability analysis and management, the system comprising: at least one memory device with computer-readable program code stored thereon; at least one communication device; at least one processing device operatively coupled to the at least one memory device and the at least one communication device, wherein executing the computer-readable code is configured to cause the at least one processing device to: receive software code and metadata corresponding to existing issues and defects present in the software code or associated with implementation of the software code; apply a deep learning technique to extract data from the software code, wherein the deep learning technique further comprises using a long short-term memory module to predict future implications of deploying the software code in an existing software environment, wherein the data corresponds to potential issues and defects in the software code; populate a knowledge graph database with the metadata and extracted data from the software code; further populate the knowledge graph with metadata and extracted data from one or more currently installed software programs that interact with the software code to create a unified cybersecurity ontology; define a threat context indicator comprising a metric for identifying a vulnerability based on the unified cybersecurity ontology; and identify specific vulnerabilities based on data relationships in the unified cybersecurity ontology.

2. The system of claim 1, wherein the system is further configured to present a user with a management interface allowing the user to query the security vulnerability analysis and management platform to determine the identified specific vulnerabilities.

3. The system of claim 2, wherein the management interface displays the identified specific vulnerabilities as a knowledge graph ontology comprising graphical depictions of data relationships.

4. The system of claim 1, wherein the system is further configured to alert a user of the identified specific vulnerabilities.

5. The system of claim 1, wherein the unified cybersecurity ontology further comprises a library dependency tree, a bug and issues tree, and an installed software dependency tree.

6. The system of claim 1, wherein the deep learning technique produces output data in resource description framework format.

7. A computer program product for security vulnerability analysis and management with at least one non-transitory computer-readable medium having computer-readable program code portions embodied therein, the computer-readable program code portions comprising: an executable portion configured to receive software code and metadata corresponding to existing issues and defects present in the software code or associated with implementation of the software code; an executable portion configured to apply a deep learning technique to extract data from the software code, wherein the deep learning technique further comprises using a long short-term existing software environment, wherein the data corresponds to potential issues and defects in the software code; an executable portion configured to populate a knowledge graph database with the metadata and extracted data from the software code; an executable portion configured to further populate the knowledge graph with metadata and extracted data from one or more currently installed software programs that interact with the software code to create a unified cybersecurity ontology; an executable portion configured to define a threat context indicator comprising a metric for identifying a vulnerability based on the unified cybersecurity ontology; and an executable portion configured to identify specific vulnerabilities based on data relationships in the unified cybersecurity ontology.

8. The computer program product of claim 7, further configured to present a user with a management interface allowing the user to query the security vulnerability analysis and management platform to determine the identified specific vulnerabilities.

9. The computer program product of claim 8, wherein the management interface displays the identified specific vulnerabilities as a knowledge graph ontology comprising graphical depictions of data relationships.

10. The computer program product of claim 8, further configured to alert a user of the identified specific vulnerabilities.

11. The computer program product of claim 8, wherein the unified cybersecurity ontology further comprises a library dependency tree, a bug and issues tree, and an installed software dependency tree.

12. The computer program product of claim 8, wherein the deep learning technique produces output data in resource description framework format.

13. A computer-implemented method for security vulnerability analysis and management, the method comprising: receiving software code and metadata corresponding to existing issues and defects present in the software code or associated with implementation of the software code; applying a deep learning technique to extract data from the software code, wherein the deep learning technique further comprises using a long short-term memory module to predict future implications of deploying the software code in an existing software environment, where the data corresponds to potential issues and defects in the software code; populating a knowledge graph database with the metadata and extracted data from the software code; further populating the knowledge graph with metadata and extracted data from one or more currently installed software programs that interact with the software code to create a unified cybersecurity ontology; defining a threat context indicator comprising a metric for identifying a vulnerability based on the unified cybersecurity ontology; and identifying specific vulnerabilities based on data relationships in the unified cybersecurity ontology.

14. The computer-implemented method of claim 13, wherein the system is further configured to present a user with a management interface allowing the user to query the security vulnerability analysis and management platform to determine the identified specific vulnerabilities.

15. The computer-implemented method of claim 14, wherein the management interface displays the identified specific vulnerabilities as a knowledge graph ontology comprising graphical depictions of data relationships.

16. The computer-implemented method of claim 13, wherein the system is further configured to alert a user of the identified specific vulnerabilities.

17. The computer-implemented method of claim 13, wherein the unified cybersecurity ontology further comprises a library dependency tree, a bug and issues tree, and an installed software dependency tree.

* * * * *